INVENTOR.
TERENCE J. DAVIES

United States Patent Office 3,708,286
Patented Jan. 2, 1973

3,708,286
PHOTOELECTROPHORETIC IMAGING WITH
ULTRASONIC VIBRATION DURING IMAGING
Terence J. Davies, Santa Barbara, Calif., assignor to
Xerox Corporation, Rochester, N.Y.
Filed Oct. 3, 1968, Ser. No. 764,719
Int. Cl. G03g 13/22
U.S. Cl. 96—1                         5 Claims

ABSTRACT OF THE DISCLOSURE

Method and apparatus for improving image density, contrast and quality and photographic speed in an electrophoretic imaging system utilizing a particulate suspension for forming the image. The method and apparatus stress a layer of the electrophoretic suspension of particles in a carrier on an electrode during imaging by applying a high frequency oscillation, preferably ultrasonic, across the imaging suspension.

---

This invention relates in general to electrophoretic imaging and more specifically to a method and apparatus for improved quality of the images produced.

A new imaging system in which one or more types of photosensitive radiant energy absorbing particles believed to bear a charge when suspended in a non-conductive liquid carrier and placed in an electroded system and exposed to an image radiation configuration has recently been described. See Pat. No. 3,384,565, dated May 21, 1968, and issued in the names of V. Tulagin and L. M. Carreira. The particles of this system migrate in image configuration providing a visual image at one or both of the two electrodes between which they are placed. The system employs particles which are photosensitive and which apparently undergo a net change in charge polarity upon exposure to activating radiation by interaction with one of the electrodes. No other photosensitive elements or materials are required therefore providing a very simple and inexpensive imaging technique. Mixtures of two or more differently colored particles are used to secure various colors of images and imaging mixes having different spectral responses. Particles in these mixes may have either separate or overlapping spectral response curves and may even be used in subtractive color synthesis. In a monochromatic system the particles will migrate if energy of any wavelength within the panchromatic spectrum of the particle response strikes the particle.

It may be that other systems exist or will be discovered or invented that require in their operation suspensions that have some or enough of the properties of the suspensions described herein that this invention can be used thereon to improve such a system and such use is contemplated hereby.

It is an object of this invention to provide a method and apparatus for improving electrophoretic imaging systems.

Another object of this invention is to improve the photographic speed of suspensions in inking systems. Still another object of this invention is to improve image quality in certain imaging systems.

A further object of this invention is to improve color saturation in particular color imaging systems.

These and other objects, features and advantages of the present invention are achieved by presenting high frequency oscillation, such as ultrasonic oscillation, across the imaging suspension while it is under imaging conditions.

These and other objects and advantages of this invention will become apparent to those skilled in the art after reading the following description taken in conjunction with the accompanying drawings wherein.

Figure 4:
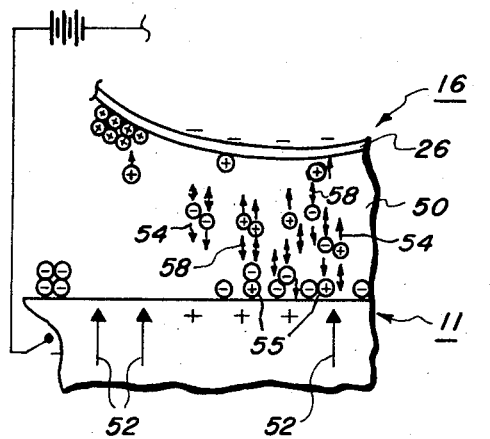

FIG. 4 schematically illustrates the stresses in the image area affected by this invention.

Figure 1:
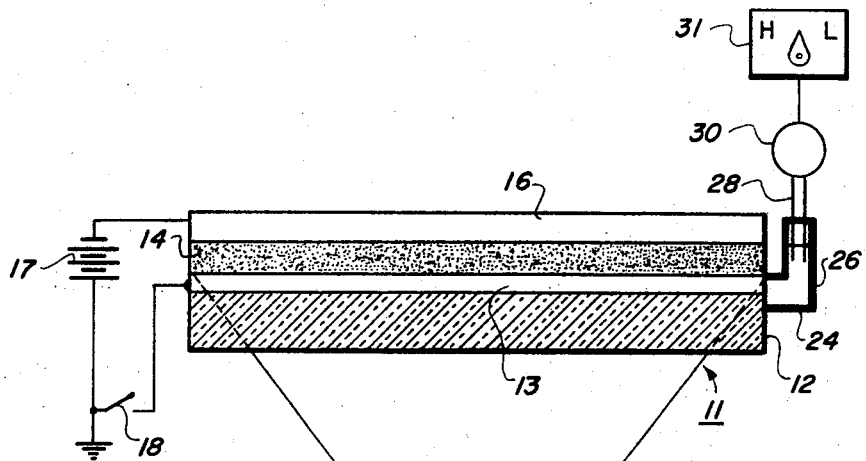
FIG. 1 is a schematic representation of an imaging system including one means of providing an oscillation within the imaging suspension for better image rendition.

Referring now to FIG. 1, there is shown a transparent electrode generally designated 11 which, for illustration, is made up of a layer of optically transparent glass 12 overcoated with a thin optically transparent layer 13 of tin oxide commercially available under the name NESA glass from Pittsburgh Plate Glass Company. This electrode is referred to as the injecting or imaging electrode. To be coated on the surface of the injecting electrode 11 is a thin layer of finely divided photosensitive particles dispersed in an insulating carrier liquid hereinafter referred to as the suspension.

The term "suspension" may be defined as a system having solid particles dispersed in a solid, liquid or gas. Nevertheless, the suspensions described for illustration are of the type having a solid dispersed in a liquid carrier. The term "photosensitive" may be defined as applying to any particle which, once attracted to the injecting electrode will migrate away from it under the influence of an applied electric field when it is exposed to actinic electromagnetic radiation.

Above the suspension 14 is a blocking electrode 16 which is connected to one side of a constant potential source 17 through a switch 18. The opposite side of the potential source 17 is connected to the injecting electrode 11 so that when the switch 18 is closed an electric field is applied across the liquid suspension 14 between electrodes 11 and 16. An image projector made up of a light source 20, a transparency 21 and a lens 22 is provided to expose the suspension 14 to a light image of the original transparency 21 to be reproduced. The optical transparency of the electrode 11 is shown by way of example and does not affect the scope of the invention herein. Neither does the particular environment shown for imaging. Of course, this system of exposure is merely illustrative and does not materially affect the invention herein.

The electrode 16 is connected to the potential 17. The electrode is comprised of a layer of a blocking material which may be Tedlar, a polyvinyl fluoride commercially available from E. I. du Pont de Nemours and Co., Inc., or other material. In this embodiment of the imaging system, the particle suspension is exposed to the image to be reproduced while a potential is applied across the blocking and injecting electrodes by closing switch 18. The exposure causes the exposed particles originally attracted to the electrode 11 to migrate through the liquid and adhere to the surface of the electrode 16 leaving behind a particle image on the injecting electrode surface which is a duplicate of the original transparency 21. Although cleaning of the electrodes and transferring or fixing of the images formed are not shown, it is contemplated that suitable means known in the art could be used to achieve the desired results.

The imaging electrode is attached to a trough 24 which is sealed and intimately fastened to the electrode, the latter forming one wall or a portion thereof of the trough. The trough 24 maintains a liquid 26 within it. Immersed within the liquid is an ultrasonic probe 28 which connects with an ultrasonic oscillating source 30. As the source emits its signal and the probe 28 oscillates, the liquid is affected with wave motion that causes a disturbance throughout the electrode 11. This latter disturbance is transmitted to the suspension 14 between the electrode 11 and 16. This effect on the imaging system causes image quality improvement for reasons discussed hereinafter. The frequency and the amplitude of the source 30 is independently variable by manually operating suitable apparatus such as the control 31.

Figure 2:
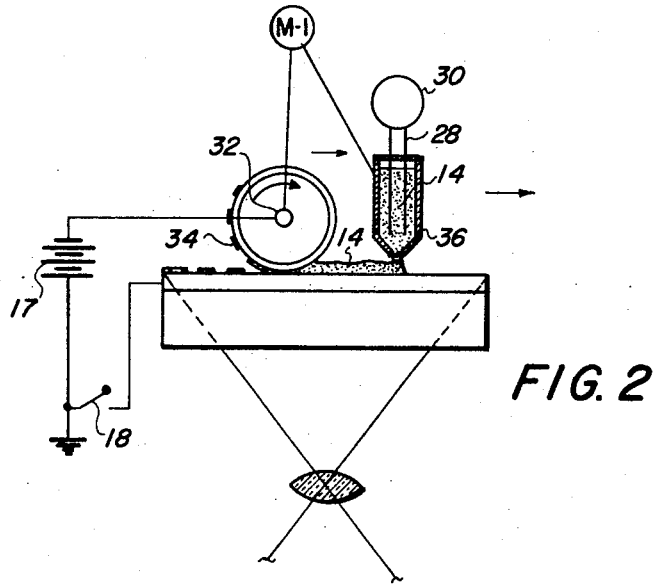
FIGS. 2 and 3 show schematically alternative apparatus.

FIG. 2 shows alternative apparatus for improving the image quality in a photoelectrophoretic imaging system of the type described in FIG. 1. Here, the blocking electrode 16 is shaped as a roller having a core 32 and a blocking material 34 wrapped around its surface. A motor M-1 moves the blocking electrode 16 across the injecting electrode 11 leaving a residue of the suspension 14 in image configuration. The electrical bias between the two rollers is supplied by a potential source 17 which is activated by a switch 18 during the traversing by blocking electrode 16 of the injecting electrode 11.

A suspension dispenser 36 moves across electrode 11 precedent to the blocking electrode roller 16 and deposits the photoelectrophoretic particles in their liquid carrier on the electrode 11. Its movement may be coupled to the electrode 16 and it may be driven by the motor M-1. When electrode 16 passes over the suspension, there is an electrical field between the electrodes. Also, the particles are subjected to activating electromagnetic radiation and migrate between the electrodes to form an image. Within the dispenser 36 is a supply of the liquid suspension 14 used in this embodiment. Extending into the liquid is the ultrasonic probe 28 of the ultrasonic oscillating source 30.

The particles in the suspension within the dispenser 36 as well as those in the suspension on the electrode 11 and between the electrodes 11 and 16 oscillate because of the transmission of the oscillation through the liquid suspension.

Figure 3:
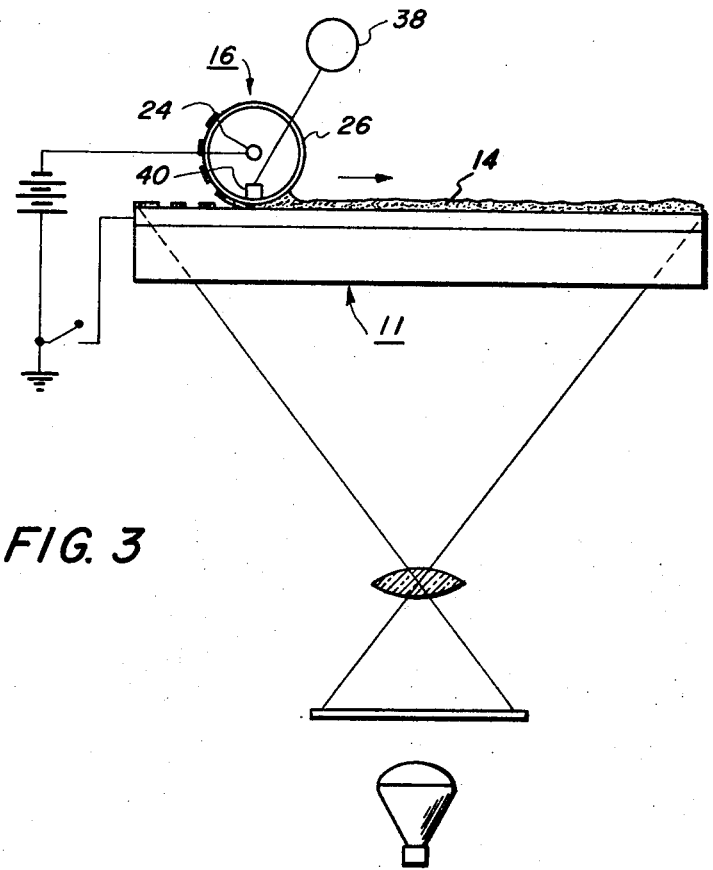

FIG. 3 shows similar apparatus to FIG. 2 but here the ultrasonic source 38 is active within the roller electrode 16. The source 38 transmits its oscillation to the roller electrode 16 by any means such as connector 40 which links the source 38 and the roller backing of the electrode 16. The connector 40 is suitably slip mounted within the roller to remain at the intersection of the roller and the injecting electrode 11 even though the roller rotates as it moves. The oscillations are translated through surface 26 to the suspension 14 located between the surface and the imaging electrode 11.

The oscillations here are preferably, but not necessarily, normal to the tangent at the intersection of the two electrodes. By orienting the direction of the oscillation perpendicular to the electrode tangent line it is possible to break up particle agglomerates while improving density and image quality. The theoretical reasons for these experimentally provable results are explained hereinafter.

The suspension 14 may be placed between the electrodes by any suitable method or apparatus and may be removed from the blocking electrode surface 26 in any manner without affecting the invention herein.

FIG. 4 is a representation for presenting a theoretical explanation for the improved results achieved by the method and apparatus described herein. There is, of course, no intention to limit the invention to the theories of operation expressed herein which are given only to clarify the results obtained with the methods and structure described.

Electrode 11 is referred to as the injecting or imaging electrode and it should be understood to mean that it is an electrode which will preferably be capable of exchanging charge with the photosensitive particles of the imaging suspension 14 when the suspension is exposed to light so that a net change in the charge polarity of the particles results. The electrode 16 is referred to as the blocking electrode meaning that it has a tendency not to inject electrons into or receive electrons from the photosensitive particles of the suspension 14. Beside Tedlar, which may be used for the blocking electrode, any other suitable material having a resistivity of about $10^7$ ohms per square centimeter or greater may be employed as the blocking electrode surface material.

A wide range of voltages may be applied between the electrodes in the system. For good image resolution, high image density and low background it is preferred that the potential applied be such as to create an electric field of at least about 300 volts per mil. across the imaging suspension. The applied potential necessary to attain this field of strength will, of course, vary depending upon the inter-electrode gap and upon the thickness and type of blocking material used on the blocking electrode surface. For the very highest image quality the optimum field is at least 2,000 volts per mil. The upper limit of the field strength is limited only by the breakdown potential of the suspension and blocking electrode material. Images produced at fields below about 300 volts per mil., are generally of low and/or low irregular density. The field utilized is calculated by dividing the potential applied between the electrodes by the inter-electrode gap measurement. The field is assumed to be applied across this gap. Thus, with two electrodes spaced about 1 mil. apart, a potential of about 300 volts applied between the blocking and injecting electrode surfaces will produce a field across the imaging suspension of about 300 volts per mil.

The particles within the suspension are non-conductive when not being struck with activating radiation. The negative particles come into contact with or are closely adjacent to the injecting electrode 11 and remain in that position under the influence of the applied electric field until they are subjected to exposure to activating electromagnetic radiation. The particles bound on the surface of the injecting electrode 11 make up the potential imaging particles for the final image to be reproduced thereon. When activating radiation strikes the particles, it is absorbed by the photosensitive particle and makes the particle conductive "creating" hole-electron pairs of charge carriers which may be considered mobile in nature. These newly created hole-electron pairs within the particles are thought to remain separated before they can combine due to the electrical field surrounding the particle between the two electrodes. The negative charge carriers of these hole-electron pairs move toward the positive electrode 11 while the positive charge carriers move toward the electrode 16. The negative charge carriers near the particle-electrode interface at electrode 11 can move across the very short distance between the particle and the surface 13 leaving the particle with the net positive charge after sufficient charge transfer. These net positively charged particles are now repelled away from the positive surface of electrode 11 and attracted toward the negative blocking electrode 16. Accordingly, the particles struck by activating radiation of a wavelength with which they are sensitive, that is to say a wavelength which will cause the formation of hole-electron pairs within the particles, move away from the electron 11 to the electrode 16 leaving behind only particles which are not exposed to sufficient electromagnetic radiation in their responsive range to undergo this change.

Consequently if all the particles in the system are sensitive to one wavelength of light or another and the system is exposed to an image with that wavelength of light, a positive image will be formed on the surface of electrode 11 by the subtraction of bound particles from its surface leaving behind bound particles in unexposed areas. If all the polarities on the system are reversed, electrode 11 will preferably be capable of accepting injected holes from bound particles upon exposure to light and electrode 16 will be a blocking electrode incapable of injecting holes into the particles when they come into contact with the surface of this electrode.

Depending on the particular use to which the system is to be put, the suspension 14 may contain one, two, three or more different particles of various colors and having various ranges of spectural response. In a monochromatic system the particles included in the suspension 14 may be of any color and produce any color and the particular point or range or spectural response is relatively immaterial as long as it shows response in some region of the spectrum which can be matched by a convenient exposure source. In polychromatic systems, the particles may be selected so that particles of different colors respond to different wavelengths in the visible spectrum thus allowing for color separation. Regardless of whether the system is employed to produce monochromatic or polychromatic images it is desirable to use particles which are relatively small in size because smaller particles produce better and more stable dispersions in the suspension and are capable of forming images of higher resolution than would be possible with particles of larger size.

When the particles are suspended in the liquid carrier, they may take on a net electrostatic charge so that they may be attracted toward one of the two electrodes in the system depending on the polarity of its charge with respect to that of the electrodes. Some of the particles in the suspension may be positive, others negative and some even bipolar. The "wrong" polarity of particles of the suspensions may affect the overall image formed by subtracting some of the particles from the system before imagewise modulation of particle migration takes place or by leaving a higher image background. In other words, the above behavior causes a portion of the suspended particles to be removed from the system as potential image-formers while others stay behind leaving a more or less uniform residue.

Further, some particles are charge injected during the imaging exposure; however, they acquire only a low positive charge. The electrical forces are too small to overcome the bonding forces such as the Van der Waals' forces and the like. The forces generated by the oscillator will dislodge the particles and the electrical field between the electrodes can act upon the particle to make it migrate.

By agitating the system, particles of the "wrong" polarity can be substantially separated from the injecting electrode 11. This would provide better, quicker, more complete and intense imaging when the electrode 16 contacts the suspension being subjected to actinic radiation in image configuration.

Let us consider a three color subtraction system where the suspension contains individual particles of a magenta, yellow the cyan color which are sensitive to green, blue and red wavelength radiation respectively. Under optimum conditions consider that green light exposes the electroconductive glass processing the tri-mix (suspension with the three color particles mentioned above). The magenta particles absorb the light while the cyan and yellow particles reflect the light. The particles made conductive by absorbing the radiation exchange charge with the electroconductive glass as mentioned above. The magenta particles, as a result of their activation by exposure to the green light, become positive and migrate away from the injecting electrode. The cyan and yellow particles remain generally insulating and are not affected since they have little or no photosensitivity in the green light range of the spectrum. The magenta particles migrate selectively as made conductive to the negative blocking roller or electrode as the electrode traverses over the imaging surface. Thus a color reproduction of the original green light is obtained in image configuration on the injecting electrode by subtractive color. That is, the cyan and yellow pigments remaining appear green when viewed. This image then may be transferred using any suitable means known in the art such as that discussed in copending application Ser. No. 459,860, filed on May 28, 1965, in the name of V. Mihajlov et al. and entitled, "Imaging Processes" now abandoned.

The theory of operation of the imaging and the benefits derived from applying a high fresuency oscillation across the suspension between the injecting electrode 11 and blocking electrode 16 is illustrated in FIG. 4. The small circles represent a small portion of the individual particles of pigment greatly exaggerated in size held in the suspension liquid 50. The large arrows 52 represent activating electromagnetic radiation which cause migration of the particles from the injecting electrode. The plus and minus signs pictured within the particles represent the charge of the particle in the suspension after action by the electromagnetic radiation shown. Some particles are randomly shown attached to each other or agglomerated. The wiggling lines, such as line 54, represent the motion of the particle through the suspension while the straight lines such as line 58 indicates the action of the oscillation force on the particle or particle agglomerates. Generally the particles are not symmetrical in shape. They do tend to agglomerate, apparently without much regard for the intrinsic color of each particle.

There is a bias placed between the two electrodes such that positively charged particles would tend to migrate to electrode 16 where they will attach themselves, while negatively charged particles will tend to settle on electrode 11. When electromagnetic radiation such as that illustrated by the arrows 52 strike the particles on the injecting electrode 11, they tend to form hole-electron pairs releasing their electron to the injecting electrode 11 and migrating due to their positive charge to the negatively biased electrode 16. The agitation caused by the ultrasonic oscillation applied across the electrodes is thought to have two effects. One: it takes positively charged particles that are wrongly held near or at the injecting electrode 11 and shakes them loose. These particles are maintained on the injecting electrode due to such bonding forces as Van der Waals' forces, capillary forces, and gravity, as well as possibly molecular and other small forces. By causing the particles to oscillate, the bonding forces, dependent on the close spacing between the involved particle 55 and the electrode 11, are greatly diminished and the electric field between the electrodes 11 and 16 tends to make the particles migrate toward the negative bias of the electrode 16. Two: certain groups of particles which are agglomerated will be subjected to tensile and/or shear forces due to the oscillation which is preferably normal to the tangent at the interface between the imaging electrode 11 and the blocking electrode 16. These tensile forces will tend to separate the agglomerate particles freeing the positive particles to migreate to electrode 16 and the negative particles to be attracted to the positive injecting electrode 11. When these negative particles reach the injecting electrode 11 they may be struck by electromagnetic radiation activating them. They then become positive and to move to the blocking electrode 16 in the manner described above. This second effect on the particle is only achievable during imaging if the oscillations are normal to the imaging electrode or the tangent thereto. This is so because the forces necessary to break the agglomerates may smear and destroy the image if non-normal forces are present.

If the force levels are kept low enough so that the image will not be destroyed, oscillations can cause forces in any direction and still function to improve the image. The only limitation in having a multidirectional oscillation of limited force is that agglomerates will not be separated.

The arrows shown within the suspension (designated 58) are merely representative of the forces applied to the suspension between the electrodes due to the oscillation carried through the suspension.

When using the methods and apparatus shown above on a photoelectrophoretic imaging system, the photographic speed and color saturation of a polychromatic system or the photographic speed alone of a monochromatic system is improved. In order to achieve these results without a noticeable striation effect, the frequency of the oscillations should be determined according to the following formula:

$$f = VcR$$

where:

$f$ = the frequency in Hertz
$Vc$ = the relative velocity between the electrodes in millimeters per second and
$R$ = resolution desired in line-pairs per millimeter.

The amplitude and the frequency used in the oscillations will depend on the response of the pigment particles of a given suspension in a specific imaging apparatus.

It is thought that the increased photographic speed of the system is a result of faster particle migration. The particle migration rate is increased because of a decrease in physical resistance between the adjacent particles of the suspension. The physical resistance to movement is decreased because of the oscillation of individaul particles caused by the mechanical forces exerted on the particle.

While this invention has been described with reference to the structures disclosed herein and while certain theories have been expressed to explain the results obtained, it is not confined to the details set forth; and this application is intended to cover such modifications or changes as may come within the purposes of the improvements or the scope of the following claims.

What is claimed is:

1. In a method for imaging electrophoretic particle suspensions having a first electrode adapted to support an image formed from the suspension, at least another electrode for contacting the suspension such that it is maintained between said electrodes, including applying an electric field across the first and the other electrodes, and exposing the suspension to an image with activating electromagnetic radiation, the improvement including applying ultrasonic oscillation across the suspension between the electrodes during exposure to the electromagnetic radiation and while the suspension is subjected to the electric field.

2. The method of claim 1 wherein the frequency of the oscillations is constant.

3. The method of claim 1 wherein said oscillation is in a direction normal to the tangent at the interface of the electrodes.

4. A method for imaging electrophoretic particle suspensions including the steps of
    providing a first electrode adapted to support an image formed from the suspension,
    contacting the suspension with at least another electrode such that the suspension is maintained between said first electrode and said other electrodes,
    exposing the suspension to an image with activating electromagnetic radiation,
    applying an electric field across the suspension between the first electrode and the other electrodes, and
    causing an ultrasonic oscillation in the suspension between said electrodes.

5. The method of claim 4 wherein the steps of exposing, causing ultrasonic oscillation and applying of an electric field occurs simultaneously.

References Cited

UNITED STATES PATENTS

| | | | |
|---|---|---|---|
| 3,099,584 | 7/1963 | Walsh | 134—1 |
| 3,384,566 | 5/1968 | Clark | 204—181 |
| 3,427,242 | 2/1969 | Mihajlov | 204—300 |
| 3,474,019 | 10/1969 | Krieger et al. | 204—181 |

JOHN C. COOPER III, Primary Examiner

U.S. Cl. X.R.

96—1.2, 1.3, 1.4; 204—181